US009063637B2

(12) United States Patent
Lisse et al.

(10) Patent No.: US 9,063,637 B2
(45) Date of Patent: Jun. 23, 2015

(54) ALTERING A VIEW OF A DOCUMENT ON A DISPLAY OF A COMPUTING DEVICE

(75) Inventors: Michelle Elena Lisse, Kirkland, WA (US); Aaron Alexander Selig, Mill Valley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/241,227

(22) Filed: Sep. 23, 2011

(65) Prior Publication Data

US 2013/0080884 A1   Mar. 28, 2013

(51) Int. Cl.
*G06F 17/00* (2006.01)
*G06F 3/0483* (2013.01)
*G06F 3/0484* (2013.01)
*G06F 17/21* (2006.01)
*G06F 17/24* (2006.01)
*G06F 3/0488* (2013.01)

(52) U.S. Cl.
CPC ............ *G06F 3/0483* (2013.01); *G06F 3/0484* (2013.01); *G06F 2203/04806* (2013.01); *G06F 17/212* (2013.01); *G06F 17/24* (2013.01); *G06F 2203/04808* (2013.01); *G06F 3/04883* (2013.01)
USPC ........................................................ 715/255

(58) Field of Classification Search
CPC .............................. G06F 17/24; G06F 3/04845
USPC ........................................................ 715/255
See application file for complete search history.

(56) References Cited

U.S. PATENT DOCUMENTS

| 5,615,384 | A |   | 3/1997 | Allard et al. |
| 5,737,599 | A | * | 4/1998 | Rowe et al. ........................... 1/1 |
| 6,353,824 | B1 |   | 3/2002 | Boguraev et al. |
| 7,441,207 | B2 |   | 10/2008 | Filner et al. |
| 7,444,598 | B2 |   | 10/2008 | Horvitz et al. |
| 7,469,381 | B2 |   | 12/2008 | Ording |
| 7,542,845 | B2 |   | 6/2009 | Sands et al. |

(Continued)

FOREIGN PATENT DOCUMENTS

| CN | 1537265 A | 10/2004 |
| CN | 101853127 A | 10/2010 |

OTHER PUBLICATIONS

Hurst et al., "Navigating VR Panoramas on Mobile Devices," Jul. 15-17, 2009, 13th International Conference Information Visualisation, pp. 203-209.

(Continued)

*Primary Examiner* — Kavita Padmanabhan
*Assistant Examiner* — Andrew McIntosh
(74) *Attorney, Agent, or Firm* — Jessica Meyers; Jim Ross; Micky Minhas (57) ABSTRACT

A document authoring program provides different views of a document opened by a user. In the editing view, the user can view the document contents and edit the contents in using a menu bar. In the semantic zoom view, the user is presented with a heading pane and a thumbnail pane and the menu bar is removed. The user can toggle from the editing view to the semantic zoom view by zooming out past a defined threshold using various user interface controls. Once the threshold is exceeded, the semantic view is presented. The editing view is returned to by selecting a heading or a thumbnail page, which respectively returns the user the page incorporating the selected heading or to the page incorporating the selected heading. This page will be displayed in the editing view at the same zoom level prior to toggling to the semantic zoom view.

16 Claims, 9 Drawing Sheets

(56) References Cited

U.S. PATENT DOCUMENTS

| | | | |
|---|---|---|---|
| 8,001,466 | B2 | 8/2011 | Kobayashi |
| 2007/0200820 | A1 | 8/2007 | Svensson et al. |
| 2008/0309632 | A1* | 12/2008 | Westerman et al. .......... 345/173 |
| 2009/0066728 | A1* | 3/2009 | Ording ......................... 345/652 |
| 2009/0073132 | A1* | 3/2009 | Lee et al. ..................... 345/173 |
| 2009/0193337 | A1 | 7/2009 | Carter et al. |
| 2009/0287994 | A1 | 11/2009 | Ichino |
| 2009/0322790 | A1 | 12/2009 | Behar et al. |
| 2010/0283743 | A1 | 11/2010 | Coddington |
| 2011/0047504 | A1 | 2/2011 | Wienands et al. |
| 2012/0124505 | A1 | 5/2012 | St. Jacques |
| 2012/0198384 | A1* | 8/2012 | Kumamoto ................... 715/786 |
| 2013/0326398 | A1 | 12/2013 | Zuvernik et al. |

OTHER PUBLICATIONS

Wu et al., "Touchware: A Software based Implementation for High Resolution Multi-touch Applications," Jun. 29-Jul. 1, 2010, 10th IEEE International Conference on Computer and Information Technology, pp. 1703-1710.

Xiang, et al., "Effective Page Segmentation Combining Pattern Analysis and Visual Separators for Browsing on Small Screens", Retrieved at <<http://ieeexplore.ieee.org/stamp/stamp.jsp?tp=&arnumber=4061481>>, Proceedings of the IEEE/WIC/ACM International Conference on Web Intelligence, Dec. 18, 2006, pp. 831-840.

Ras, David, "OneNote 2010—What's New For You", Retrieved at <<http://blogs.msdn.com/b/david_rasmussen/archive/2009/07/15/onenote-2010-what-s-new-for-you.aspx>>, Retrieved Date: Jul. 1, 2011, pp. 6.

U.S. Official Action dated Feb. 28, 2013 in U.S. Appl. No. 13/220,731, pp. 1-15.

Marrero Zaida, U.S. Official Action (for U.S. Appl. No. 13/220,731), Oct. 5, 2012, U.S. Patent and Trademark Office, Washington D.C., US, p. 1-14.

U.S. Official Action dated Oct. 6, 2013 in U.S. Appl. No. 13/220,731.

Chinese Official Action dated Nov. 19, 2014 in Chinese Application No. 201210356858.2.

"Electricviewer", Published on: Jul. 1, 2011, Available at: http://store.electricwoods.com/products/electricviewer_ios/index.php, pp. 4.

"Documents to Go for iPhone/iPad/iPod Touch Help", Published on: Date: Jul. 1, 2011, Available at: http://www.dataviz.com/handheld/support/documentstogo/iphone/#_Working_with_Sheets, pp. 24.

"Windows® Internet Explorer® Mobile on Windows Phone 7", Published on: Dec. 2010, Available at: http://download.microsoft.com/download/9/3/5/93565816-AD4E-4448-B49B-457D07ABB991/Windows%20Internet%20Explorer%20Mobile%20on%20Windows%20Phone%207_Final_122010 pdf, pp. 1-5.

* cited by examiner

ALTERING A VIEW OF A DOCUMENT ON A DISPLAY OF A COMPUTING DEVICE

BACKGROUND

Desktop productivity software, such as a document authoring program, allows users to create, edit, and review various types of documents. One such program is the Word® document authoring application program from Microsoft® Corporation. When reviewing a document using a document authoring program, a user may frequently review specific portions of the document, as well as obtain a context of that specific portion with respect to overall document. Various steps may be required by the user to navigate the document, or otherwise obtain the context of the specific portion of the document. Depending on the size of the document, the type of device used, and other factors, this process can be time consuming. A faster, more intuitive approach for accomplishing this would facilitate users reviewing documents.

It is with respect to these and other considerations that the disclosure made herein is presented.

SUMMARY

Concepts and technologies are described herein for facilitating reviewing a document, which involves the user reviewing the document in two different viewing modes at different times. In a first viewing mode, a user may review the document in what is termed an editing viewing mode. The user can easily switch to another viewing mode termed the semantic zoom viewing mode. The semantic zoom viewing mode may incorporate a search box along with two panes—a heading pane and a thumbnail pane. These panes allow the user to quickly derive a context of a particular portion of the document.

In one embodiment, a method alters a view of a document that includes the operations of providing on a display of a computer processing device an editing view of a document at a zoom level such that input from a user can be received to edit content of the document. Further, input can be received from the user requesting to zoom-out the editing view of the document from the zoom level. The operations further include testing whether a resulting zoom level of the document is less than a threshold zoom level, and in response to determining the resulting zoom level is less than the threshold zoom level, and altering the view of the document to provide a semantic zoom view of the document in response to determining the resulting zoom level is less than the threshold zoom level, wherein a plurality of thumbnails pages are provided on the display, and wherein input from the user cannot be used to edit the content of the document.

In another embodiment, a computer-readable storage medium includes instructions that when executed cause a computer to provide on a display of the computer processing device an editing view of a document at a zoom level such that input from a user can be received to edit content of the document, receive input from the user requesting to zoom-out the editing view of the document from the zoom level, and test whether a resulting zoom level of the document is less than a threshold zoom level. The instructions further cause the computer in response to determining the resulting zoom level is less than the threshold zoom level, to alter the view of the document to provide a semantic zoom view of the document wherein a plurality of thumbnails pages are provided on the display, wherein input from the user does not edit content of the document.

In another embodiment, a system for providing an editing view and a semantic zoom view including a display, an input device configured to receive a first input and a processor. The processor is configured to use the display to provide an editing view including a document that includes providing a page at a zoom level wherein a content of the document can be edited based on input from the input device. The processor is further configured to receive the first input from the input device indicating a zoom-out request wherein the zoom-out request exceeds a threshold level. The processor is further configured to use the display to provide a semantic view of the document that includes a plurality of thumbnail pages in a thumbnail pane and a plurality of headings in a heading pane, wherein the plurality of headings are derived from the document.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to facilitating the altering of the views of a document in a document authoring program. A document authoring program could encompass, for example, a word processing document that allows a user to create, edit, and otherwise manage a document. A document can be viewed in an editing viewing mode or in a semantic zoom viewing mode. In the semantic zoom viewing mode, a heading pane and a thumbnail may be provided to the user. Altering the viewing mode of the document is referred to as "toggling" (or "toggling the view"). Toggling the view can be easily performed in one embodiment by a user providing certain touch inputs on a touch screen of a computing device. Changing from the editing viewing mode to the semantic zoom viewing mode can be referred to as performing a "semantic zoom."

Although the concepts are illustrated with respect to a document in an editing viewing mode and a semantic zoom viewing mode, those skilled in the art will recognize that other types of viewings modes are possible. For example, a web browser or other suitable viewing program could view a document as a web-based document, in a so-called "web view." A document could also be viewed in a viewing program in a so-called read-only or "reading mode," "outline view", or "draft view." Various types of viewing modes are possible, and the use of the editing viewing mode does not preclude application of the concepts to other types of viewing modes.

In the following detailed description, references are made to the accompanying drawings that form a part hereof, and which are shown by way of illustration specific embodiments or examples. Referring now to the drawings, in which like numerals represent like elements throughout the several figures, aspects of a system are presented for performing a semantic zoom of a document.

The concepts and principles for performing a semantic zoom are illustrated herein using the context of a document that is a text based document and document authoring program that is a word processing application program respectively. However, the concepts and principles disclosed herein can be applied to other types of documents that are authored using other types of document authoring programs. Specifically, although illustrated using a text-based document, the term "document" as used herein could refer to any type of file manipulated by a user that comprises text, numbers, symbols, graphic images, and/or other types of media. Such document may include spreadsheets, slides, video presentations, etc. created by corresponding application programs.

Figure 1:
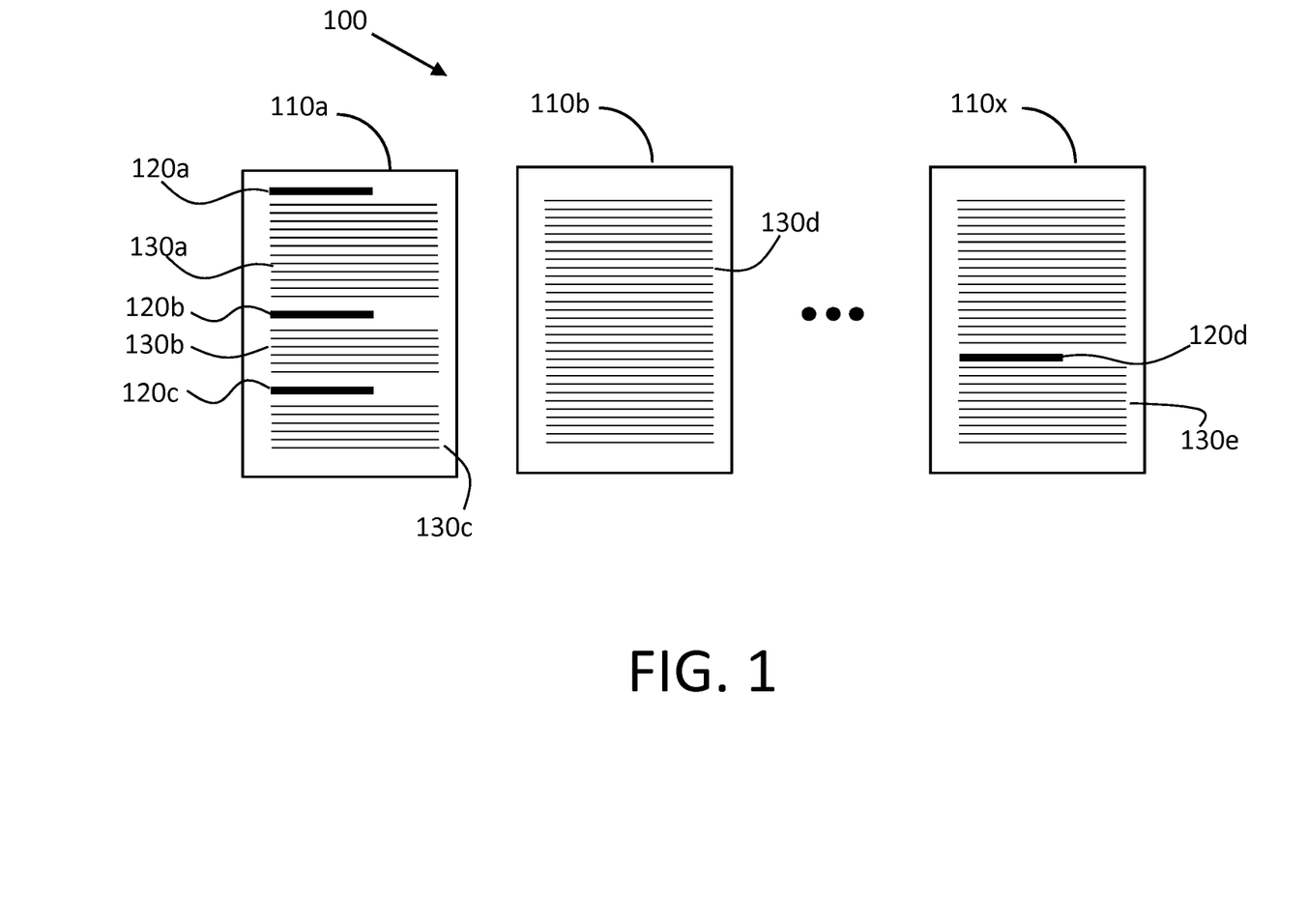
FIG. 1 is a schematic diagram illustrating pages of a document as provided in one embodiment presented herein.

One embodiment of a document is illustrated in FIG. 1. FIG. 1 shows various parts of a document 100, which can logically be divided into pages 110a-110x (collectively referred to as 110). The number of pages can vary, and although illustrated as comprising text, other images, graphics, or icons can be incorporated into the document 100. FIG. 1 is intended to merely illustrate portions of a document 100, and should not be construed as implying any sort of display of the pages 110 on a processing device.

In this embodiment, each page 110 comprises portions that can be classified either as a heading 120a-120d (collectively referred to as 120) or as text 130a-130e (collectively referred to as 130). The headings 120 are illustrated via a single bold line (e.g. 120a) and the text 130 is illustrated as a section comprising a plurality of thinner lines (e.g., 130a). The semantic meaning of the heading 120 or text 130 is not relevant at this point; hence a line is sufficient to delineate the text from the heading for purposes of this illustration. In this example, there are four distinct headings 120a-120d and five sections of text 130a-130e.

In various document authoring programs, the document 100 can be displayed in various ways to a user. Each method of display is called a "view." In one view, referred to as the editing viewing mode, typically a portion a page 110 or an entire single page 110 is displayed. In other configurations, two pages (a.k.a. "dual page" or "reflow" format) are displayed side-by-side, mimicking the layout of a book. In other configurations, the document may not be sub-divided into pages, but is presented as a single, continuous flow of text, of which a section corresponding to that which can be shown on the screen is displayed at a given time. The editing viewing mode is commonly used when the user is editing text in the document. In various embodiments, various presentations of the text can be represented.

Figure 2A:
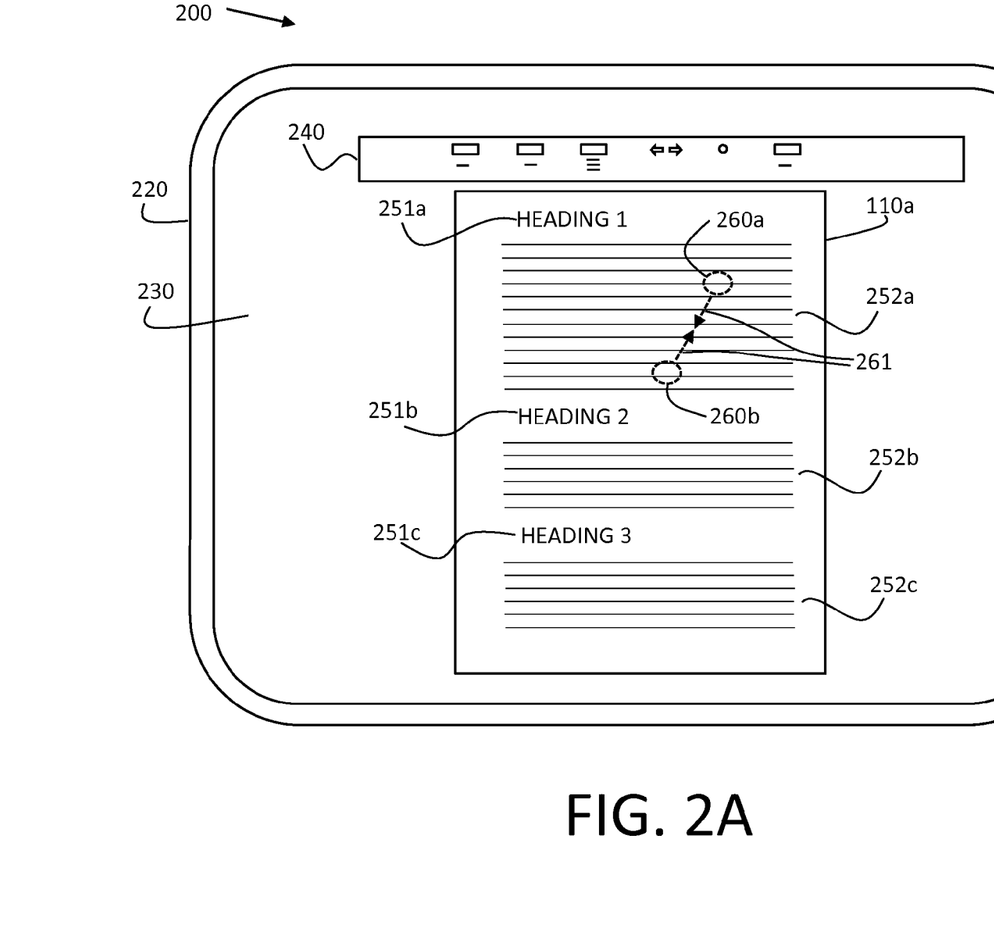
FIGS. 2A and 2B are schematic diagrams of a page in a document as displayed on a mobile computing device in accordance with one embodiment disclosed herein.

One such embodiment of an editing viewing is illustrated in FIG. 2A. FIG. 2A illustrates a configuration 200 involving a tablet computing device 220 with a display 230 that also is a touch-screen. The display 230 in this illustration shows a single page 110a. Unlike the depiction of the page 110a in FIG. 1, the depiction of page 110a in FIG. 2 comprises nominal text for the headings 251a-251c. Although FIG. 2 illustrates the page 110a using a tablet computing device 220, various other forms of computing devices or computers may be used, including laptops, smart phones, desk top computers, e-book readers, etc. Further, although the tablet computer device 220 comprises a touch-screen, the concepts are not limited in application to devices with touch-screens. Computing devices relying on a pointer, mouse, keyboard, touchpad, or other form of user input can be used to practice the concepts disclosed herein.

In one embodiment, the document authoring program displays a toolbar 240, ribbon, or other type of control panel that provides icons and/or commands for authoring the document in the editing viewing mode. The toolbar 240 may be organized in various ways. The toolbar 240 allows the user to invoke various functions used to edit portions of the document. Thus, the presence of the toolbar 240 is one indication to the user that the document is being viewed in the editing viewing mode.

Figure 2B:
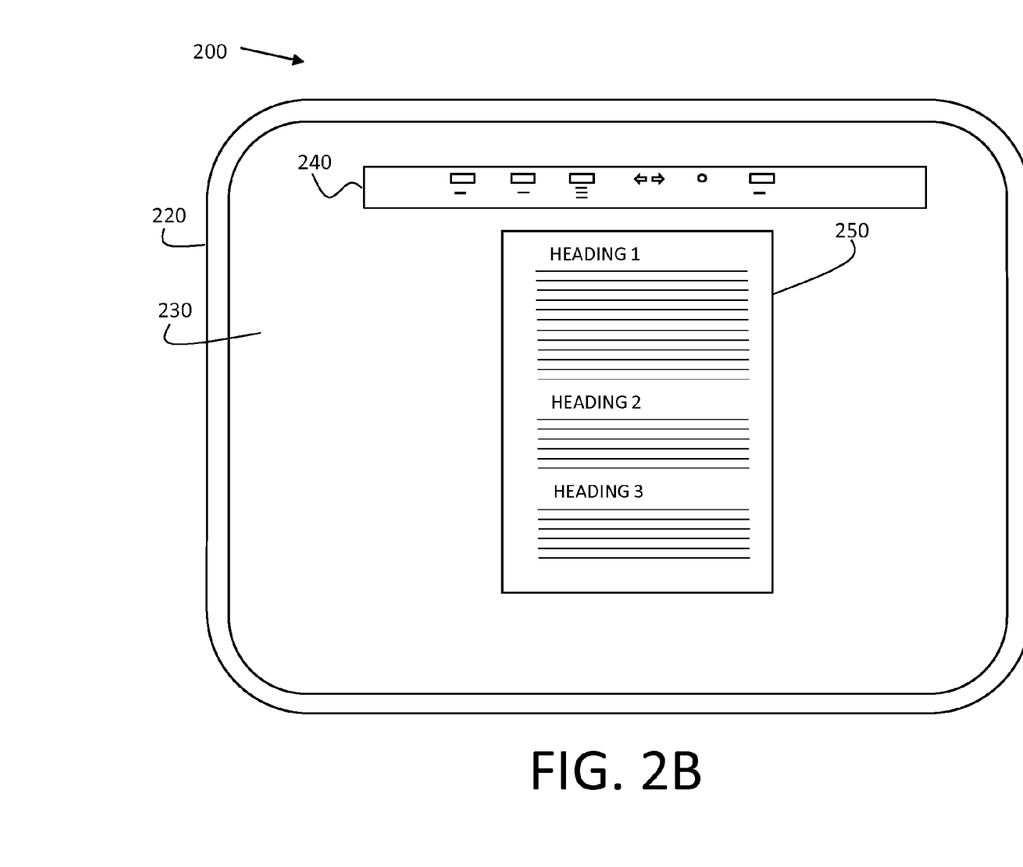

The user can zoom-in or zoom-out of the document page 110a in the editing viewing mode. In FIG. 2B, the document page 110a is shown smaller in size, reflecting that the user has zoomed-out of the document page 110a relative to FIG. 2A. Thus, the page 110a in FIG. 2B occupies less space on the display 230 compared to that in FIG. 2A. The size of the toolbar 240 typically does not change when zooming-in or zooming-out of the document.

Figure 3:
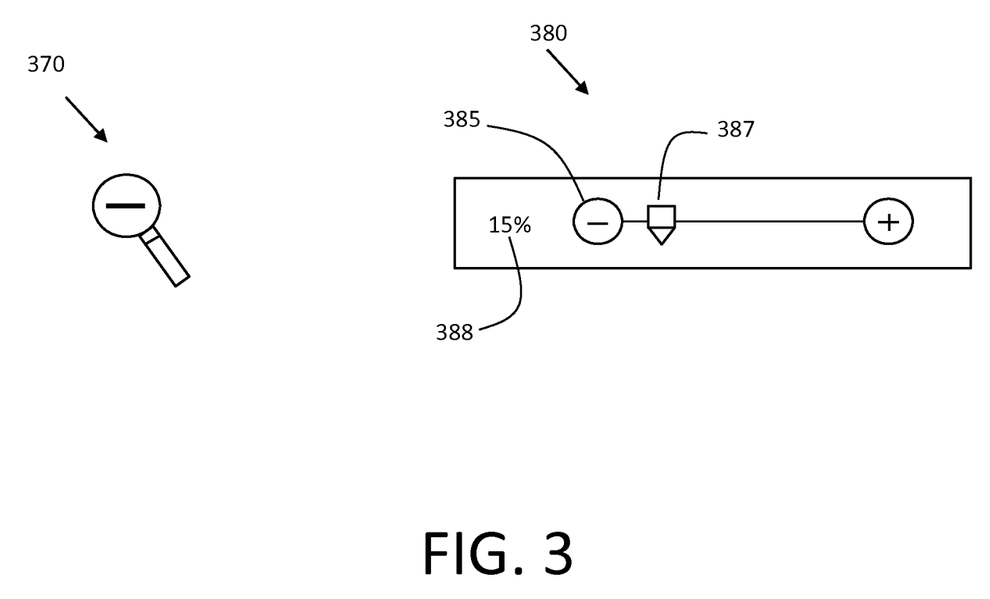
FIG. 3 is a schematic diagram illustrating various graphical user interface controls that can be used to zoom-out of an editing viewing mode in accordance with one embodiment disclosed herein.

The user may indicate a request to zoom-out in various ways. There may be an icon 370, such as shown in FIG. 3, displayed on the toolbar 240 or other area on the display 230 that can be used to zoom-out. In other embodiments, a command may be present on the toolbar 240 that the user can select to zoom-out, or a control key sequence can be invoked requesting this function. In some embodiments a control panel is presented allowing the user to indicate a specific zoom level, or select one of several pre-defined zoom levels.

Another control method involves using a zoom control 380. The user can select and move the slide 387 to alter the zoom level. Typically, moving the slide 387 to the left towards an icon indicating a minus sign ("−") decreases the zoom level. A corresponding numerical zoom level value 388 is updated in real-time as the slide 387 is moved. In other embodiments, the user can press the control key ("CTRL") and move a mouse scroll wheel ("CTRL+scroll") to alter the zoom level Another control method to alter the zoom level is indicated in FIG. 2A. This method applies to using a device with a touch screen, such as mobile device such as a tablet computer or smart phone. When the user is using a tablet with a touch screen, the user can place two fingers on the touch screen 230. In this embodiment, the locations selected by the user are designated by circles 260a, 260b (collectively referred to as 260). Typically, these locations can be anywhere over the document page 110a. The locations 260 are initially a certain distance apart, and the user moves these two fingers towards each other while maintaining contact on the touch-screen as designated by the arrows 261. This action is sometimes referred to as a "pinching" motion or "pinching the touch screen."

Other forms of user control are possible. For example, voice commands could be used to toggle from one view to the other view. Specifically, voice commands could be recognized to toggle the view, such as "zoom out" or "change view." Other commands could be used as well. These commands may depend on the current viewing state. Other forms of user control include defined movement of the device. Many devices incorporate accelerometer or similar mechanisms to detect an orientation and/or position of the device. Thus, rapid movement that shifts the device away from the user could be interpreted as a zoom-out request. Other embodiments may incorporate screen functions (button, tabs, pull-down menus) which toggle the view, or change to an indicated view. Other types of movement could be interpreted as a zoom-out or toggle request. Any of these methods can be used by a user to indicate input to zoom-out. Depending on the device and the document authoring program, these or other methods may be offered to the user to indicate a zoom-out request.

When in the editing viewing mode, a zoom-out request will reduce the image of the page 110*a* to an extent. For example, in one embodiment the reduced representation of the page 110*a* in FIG. 2B could be reduced still further. However, there are practical limits as to how small the page 110*a* can be shown and still allow the user to effectively edit the page once. Specifically, depending on the mobile device's screen area 230, the resolution of the screen, as well as other factors, the page 250 may be reduced to a level where editing is not practical. When this occurs, the toolbar 240 is still displayed, which takes up valuable space on the display, even though editing is not practical.

To avoid this situation, the document authoring program can interpret a request to zoom-out beyond a certain threshold level as a trigger to switch the view. Specifically, zooming out beyond the threshold level is interpreted as an implicit request to toggle to a different view—the semantic zoom view. The threshold level can be expressed as a percentage of the current zoom level, for example, as shown by in the zoom control 380 of FIG. 3. In one embodiment, the threshold is 15%. Specifically, reducing the zoom level to 15% or less toggles the view from the editing viewing mode to the semantic zoom viewing mode. Similarly, a request to zoom-in from the semantic zoom viewing mode beyond 15% can be interpreted as an implicit request to return to the editing viewing mode.

Figure 4:
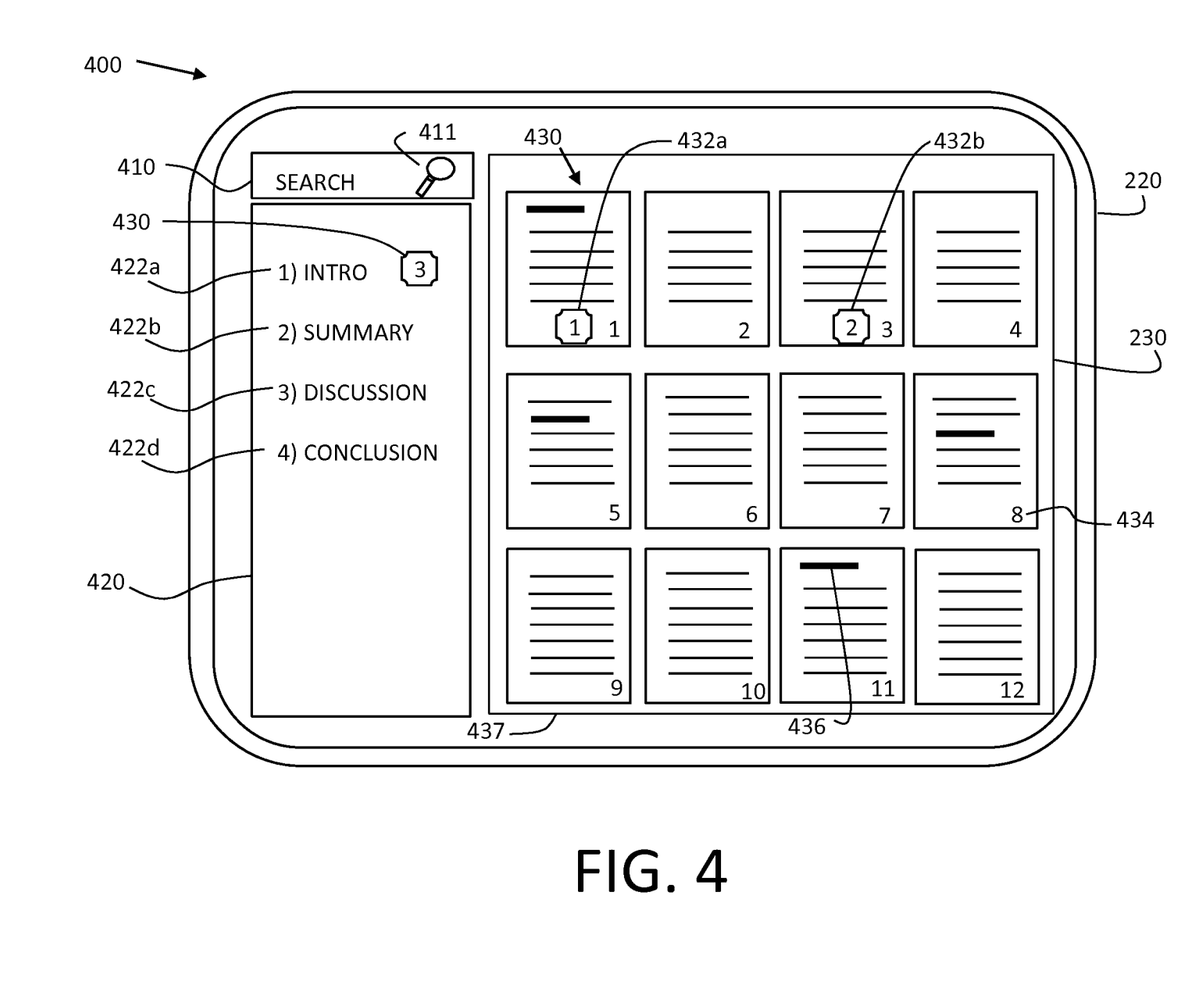
FIG. 4 is a schematic diagram illustrating a semantic zoom viewing mode comprising a thumbnail pane and a heading pane of a document in accordance with one embodiment disclosed herein.

One embodiment of the semantic zoom viewing mode of the document is shown in FIG. 4. In FIG. 4, the display screen 230 of the mobile device 220 displays a series of thumbnail pages 430. The phrase "thumbnail page" (or simply "thumbnail") refers to a miniature version of the document page image. The toolbar 240 is not displayed in the semantic zoom viewing, and this frees up display space that can be used presenting the thumbnail pages. In this embodiment, the document comprises a total of 24 pages (110*a*-110*x*) of which the first 12 are illustrated thumbnail pages. Each of the pages 430 has a respective page number 434 located in the lower right corner of each page.

The thumbnail pages 430 are typically fixed in size when displayed on the display area 230. Typically, the thumbnail pages 430 cannot be altered in size by zooming-in or zooming-out in this viewing mode. Thus, a fixed number of thumbnails can be shown on the display. In this embodiment, 12 thumbnail pages are shown. Thus, if the document comprises a greater number of pages than can be displayed at one time, only a subset of the total number of thumbnails is presented in the semantic zoom mode. If this occurs, the user can scroll up or down to view the other thumbnail pages.

The page that was displayed in the editing viewing mode when the zoom-out request is received determines the layout of the thumbnail pages in the semantic zoom viewing mode. In this embodiment, pages 1-12 are displayed, and it can be assumed that the page displayed in the editing mode was within this range. Typically, a similar number of preceding and following thumbnail pages are displayed.

For example, the page displayed in the editing mode may have been page 7. Thus, thumbnail pages 1-6 represent the six prior pages, and thumbnail pages 8-12 represent the five subsequent pages. This would allow the viewing to readily determine the context of a given page. In another example, if page 57 was displayed in the editing viewing mode, then when entering the thumbnail view mode thumbnail pages 51-62 would be displayed. Other embodiments may select a different number of preceding or following pages. For example, the initial thumbnail page in the semantic zoom viewing mode could correspond to the page shown in the editing viewing mode. Thus, if page 7 was shown in the editing viewing mode, then the initial page in the semantic zoom mode would be thumbnail 7 and the last one would be thumbnail page 18. Other embodiments can vary the number preceding and/or subsequent number of thumbnail pages.

The portion of the display 230 comprising the thumbnail pages 430 can be referred to as the thumbnail pane 427. In addition to the thumbnail pages 430, the screen 230 may also display a heading pane 420 and a search term box 410. The heading pane 420 is populated with headings from the document, including pages which are not displayed as thumbnail pages. If the document has no headings, then no heading pane 420 is generated.

In other embodiments, the layout configuration can be different. In one embodiment, once the semantic view is entered, the headings and thumbnail pages can be presented with different layouts, user interfaces, or even on separate screen displays. For example, there could be a semantic view defined as having only a thumbnail pane, a thumbnail pane and heading pane, or only a heading pane. Users could toggle between these various types of semantic views. Those skilled in the art will recognize that variations on the layout are possible.

In this embodiment, there are four headings 422*a*-422*d* (collectively referred to as 422) in the document. Each heading 422 corresponds to a heading found in one of the pages in the document. For example, FIG. 4 illustrates headings with a bold line in the thumbnails and the last heading 422*d* ("Conclusion") corresponds to the last heading 436 on thumbnail for page 11.

If the heading pane 420 is not capable of displaying all the headings in the pages in the document, then only those headings which can be displayed in the heading pane are displayed, and the user can scroll up or down as needed, using controls as appropriate (not shown in FIG. 4).

Both the heading pane 420 and the thumbnail pages 430 can indicate the number of comments which are incorporated into the document. This is indicated by using a comment icon 430 having a number within the icon that corresponds to the number of comments in either the section or the page, as appropriate. For example, the comment icon 430 associated with the first heading 422*a* indicates that three comments are present. Similarly, the first thumbnail page has a comment icon 432*a* indicating one comment is present on that page. Another comment icon 432*b* on the third thumbnail page indicates there are two comments on that page. Thus, there are a total of three comments in the first section that are divided so that one comment is on the first page and two comments are on the third page. The comment icons can be useful for a user reviewing a document to quickly ascertain at a high level where, and to what extent, comments in a section or page have been inserted, without having to enter the editing view mode and examine each page individually.

As indicated previously, the user can quickly toggle from the editing view to the semantic zoom view by pinching the display screen or otherwise zooming-out to a level of 15% or less. Once the thumbnail pane 437 and the heading pane 420 are presented, the user can easily toggle back to the editing viewing mode. This can be accomplished by selecting a thumbnail page in the semantic viewing mode. In one embodiment, selecting a thumbnail page can be accomplishing by double tapping the thumbnail page on the touch screen, which returns to the editing viewing mode.

Assuming the user is in the semantic zoom viewing mode, the user may navigate the thumbnail pages 430 in the thumbnail pane 437. Assuming that there are more thumbnail pages than can be displayed at one time in the thumbnail pane 437, the user may be able to scroll up, down, or sideways in various embodiments. Other embodiments may limit scrolling to only up and down. These functions can be indicated using controls (not shown in FIG. 4) such as a touch sliding motion on a touch screen, selecting a page up/down icon, etc.

Once the user is in the semantic zoom viewing mode, the user may enter a search term in the search box 410. Indication of a search term is then followed by selecting the search icon 411. The search function will cause a filtering of the thumbnail images, so that only the thumbnail pages with the indicated search term are presented in the thumbnail pane 437. Thus, in the example shown in FIG. 4, if a term was only found on thumbnail pages 3 and 6, then only these two thumbnail images would be displayed. If the search term is not found on any pages, then no thumbnail pages would be displayed.

If a search was performed with a subset of the thumbnail pages presented, the user can clear the contents of the search box by pressing, e.g., an escape ("esc") key. This will result in restoring all the thumbnails in the thumbnail viewing pane 437. In one embodiment, if the user again then enters the esc key, the semantic zoom viewing mode will be exited, and the editing viewing mode will be restored.

Turning now to the heading pane 420, the user may select a heading shown in the heading pane 420. In one embodiment, this can be accomplished, for example, by touching the appropriate heading text on a tablet computer thereby selecting the heading. In one embodiment, the page in which the heading appears is presented to the user in the editing viewing mode. Thus, selecting a heading is an implicit request to toggle back to the editing viewing mode.

In other embodiments, selecting a section heading results in filtering of the thumbnail pages 430 in the thumbnail pane 437, so that the thumbnail page incorporating that heading is presented. Typically, a fixed number of preceding as well as succeeding thumbnail pages are also presented. For example, if the heading appeared on page 50 of a 100 page document, then the thumbnail images for pages 44-55 may be presented. In one embodiment, the thumbnail page with the heading is presented approximately in the middle of the thumbnail pane 437. If, however, the number of thumbnail pages is less than the number thumbnails that could be presented in the thumbnail pane, then all the thumbnails would be presented.

Figure 5:
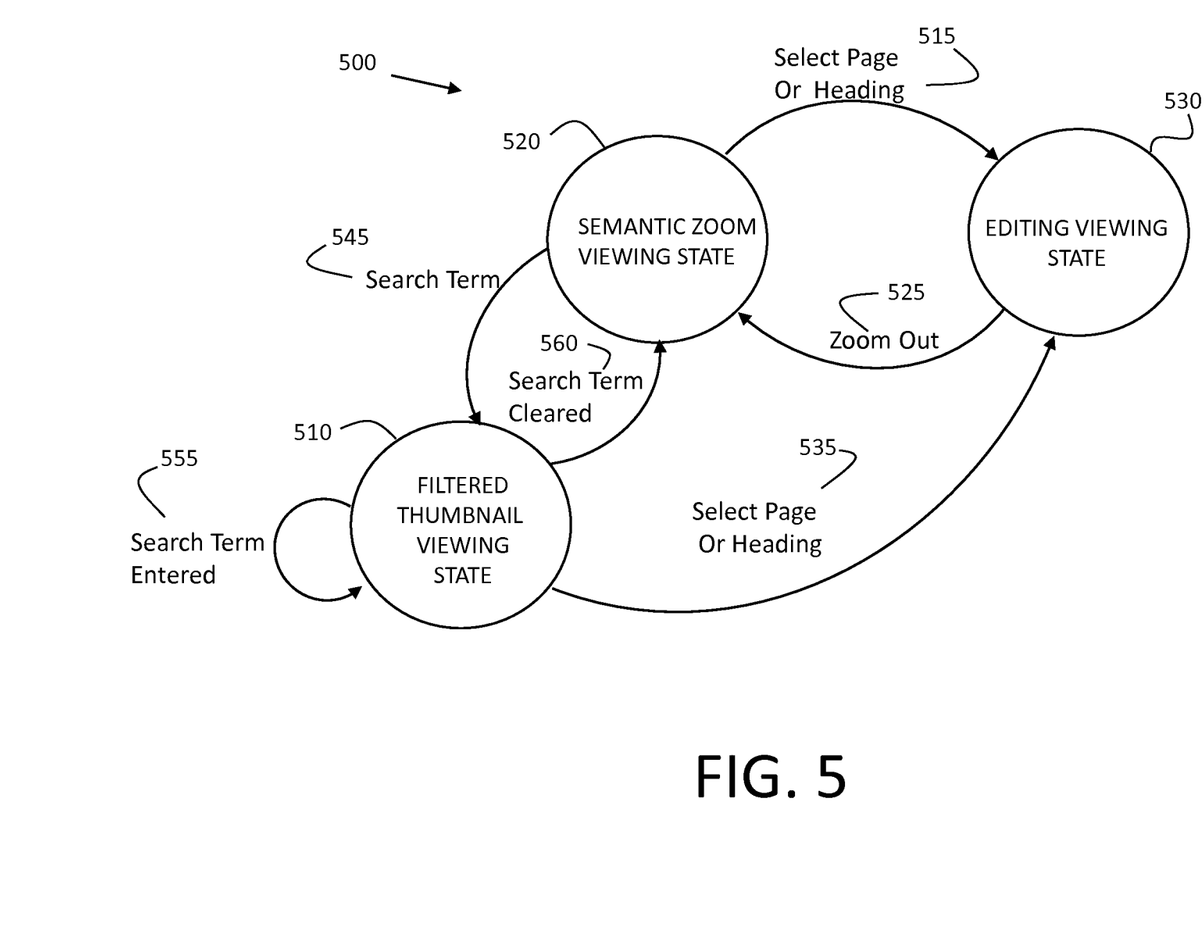
FIG. 5 is a schematic diagram illustrating a state transition diagram for toggling viewing modes according to one embodiment presented herein.

The processing of inputs from the user with respect to toggling of the viewing mode is illustrated by the state transition diagram 500 of FIG. 5. It should be appreciated that the logical operations described herein with respect to FIG. 5 and the other FIGURES are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. It should also be appreciated that more or less operations may be performed than shown in the FIG. 5 and described herein. These operations may also be performed in a different order than those described herein.

In FIG. 5, the semantic zoom viewing state 530 and the thumbnail viewing state 520 correspond to the previously identified viewing modes. Specifically, the editing viewing state 530 corresponds, for example, to the view of the document shown in FIG. 2A or 2B. In the editing viewing state, the user can edit the document, and zoom-in or zoom-out to various levels, as long as the level is greater than the threshold level.

The semantic zoom viewing state 520 corresponds, for example, to the view shown in FIG. 4. In the semantic zoom viewing state, the user can view thumbnails of various pages, view the heading pane, and perform various searches.

When in the editing viewing state 530, the user will toggle to the semantic zoom viewing state 520 by providing an input to zoom-out 525 past a threshold level. In one embodiment, zooming out to 15% or less will toggle the display to the semantic zoom viewing state 520. Conversely, once in the semantic zoom viewing state 520, an input comprising selecting a page 515 will toggle the display back to the editing viewing state 530.

In the semantic zoom viewing state 520, the user may provide input comprising a search term. This results in entering the filtered thumbnail viewing state 510. This state can be considered a special case of the semantic zoom viewing state in that the contents of the thumbnail images are filtered based on input 545. Specifically, if a search term is indicated in the search box 410, the thumbnail pages are filtered to show the thumbnail pages containing the search term. In another embodiment, if a heading is selected, then the thumbnails pages are filtered to display the thumbnail page with that heading, and adjacent thumbnails.

In the filtered thumbnail viewing state 510, the user can then repeat the input 555 to search for another term, which maintains the same filtered thumbnail viewing state 510, although the thumbnail pages presented may be different. Alternatively, the user can clear the search term 560, which returns to the semantic zoom viewing state 520.

In the semantic zoom viewing state 520 or the filtered thumbnail viewing state, the user can select a particular thumbnail page. This input 535, 515 will cause a return to the editing viewing state 530 for that selected page.

The state transition diagram is one model for explaining how viewing states are toggled based on various user inputs or actions. Those skilled in the art will no doubt be able to develop variations on this model. For example, in on variation selection of a heading in the semantic viewing state could enter the filtered thumbnail viewing state 510, where the display presents those thumbnails page with the heading, and surrounding thumbnail pages.

Figure 6:
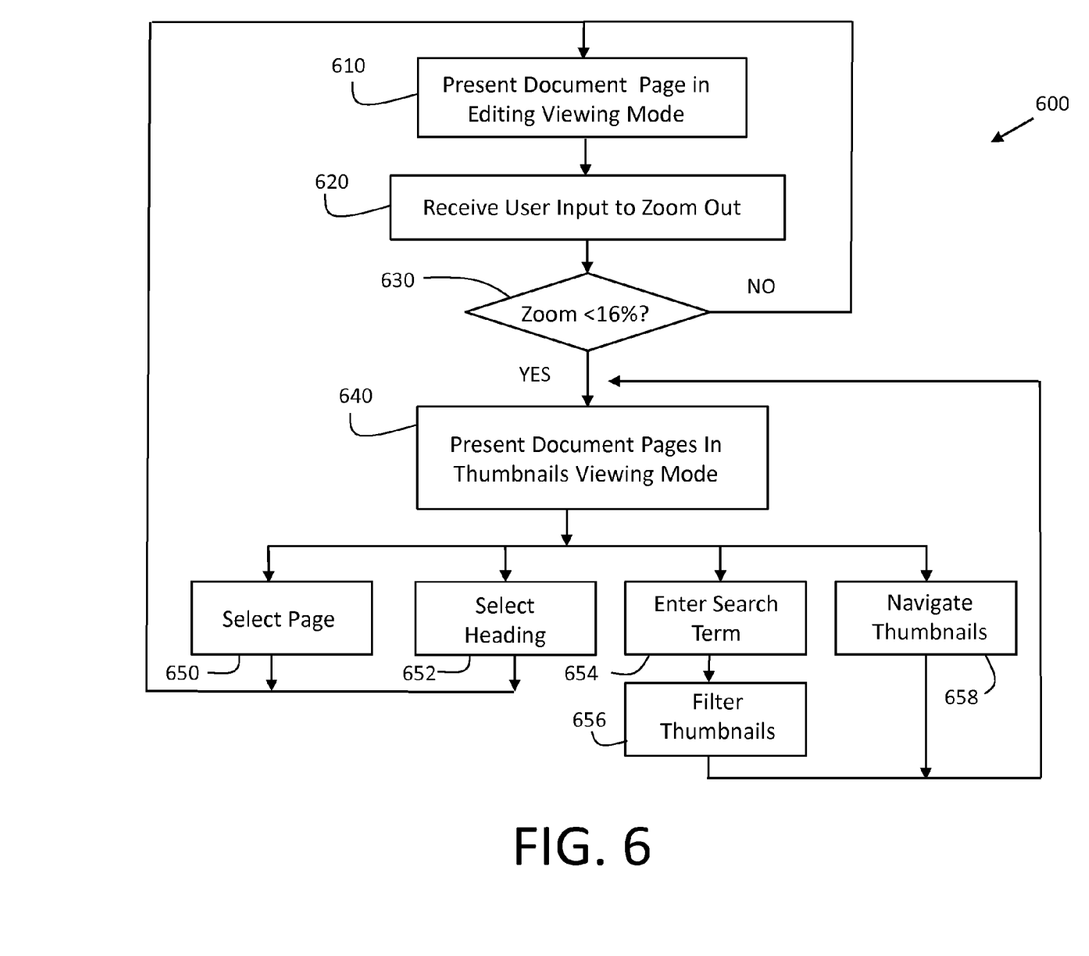
FIG. 6 is a process flow associated with toggling the viewing modes of a document according to one embodiment presented herein.

One embodiment of the process for controlling the viewing mode presented to the user is illustrated in FIG. 6. The process 600 executes in a continuous loop, as the user can toggle between different viewing modes at any time when working within a document. Starting with operation 610, the user is presented with typically a single page in an editing viewing mode. In other embodiments, where the user has configured the document authoring program to display multiple pages, the user may be presented with multiple pages, or portions of multiple pages, at this point. The page(s) may be presented in various forms, including a form mimicking the printed final form, a full screen layout, a draft form, etc.

In operation 620, the user provides input to zoom-out. This action could be interpreted as an implicit request to toggle the view to the semantic zoom viewing mode, assuming the threshold level is exceeded, or merely decreasing the page size in the editing viewing mode. Recall that various methods can be used to alter the zoom level, including selecting an icon, pinching the touch-screen display, or providing a CTRL+scroll input.

This determination is made in operation 630, which compares the zoom-out level with a threshold level. In one embodiment, the threshold level is set at 15%. Specifically, if the zoom level remains at 16% or higher, (e.g., equal to or less than 15%), then the operation returns to operation 610 where the document page is presented in the editing viewing mode (albeit at perhaps a different zoom level). If however, the zoom level is less than 16%, then processing proceeds to operation 640 where a toggling of view occurs and the user is presented with the pages of the document in the semantic zoom viewing mode.

Once the semantic zoom viewing mode is provided, the user can provide several different types of inputs as represented by inputs 650, 652, 654, and 658. In operation 650, the user can select one of the pages in the thumbnail pane 437. This will result in toggling the view so as to return to operation 610, which displays the selected page in the editing viewing mode.

If the user provides input of selecting a heading 652 in the heading pane 420, then the user is returned to the editing viewing mode in operation 650. The user is returned to the same zoom level before the thumbnail viewing mode was entered but to the document page containing that heading.

In operation 654, the user enters a search term. Upon processing the search term, the thumbnails are filtered in operation 656 to present the thumbnail pages with the indicated term. The process flow then returns operation 640 where the thumbnails are presented to the user.

If the user provides in operation 658 a request to navigate thumbnails by scrolling through thumbnails (presuming that the document comprises more thumbnails that can be displayed on a screen), then the set of thumbnails to be presented is updated as appropriate, and the process flow returns to operation 640 where the thumbnails are presented.

Figure 7:
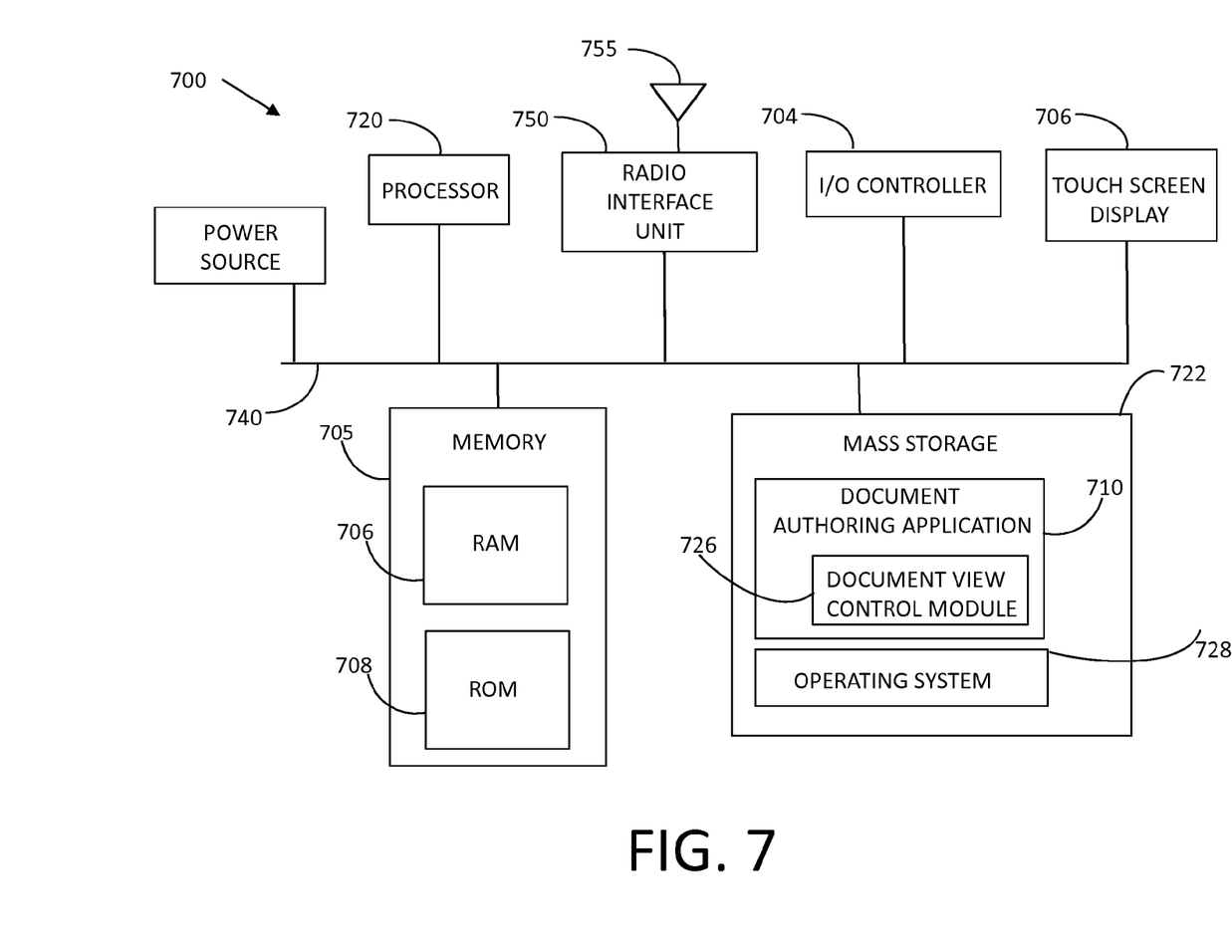
FIG. 7 illustrates a computing architecture for a mobile device implementing the process flows according to one embodiment presented herein.

The process flow described above and other related functions can be implemented in one embodiment by the computing architecture of a processing device 700 as shown in FIG. 7. FIG. 7 shows an illustrative computing architecture for a computing processing device capable of executing the software components described. The computer architecture shown in FIG. 7 may illustrate a conventional server computer, laptop, tablet, or other type of computer utilized to execute any aspect of the software components presented herein. Other architectures or computers may be used to execute the software components presented herein.

The computer architecture shown in FIG. 7 includes a processor 720 (a.k.a. as a centralized processing unit or "CPU"), a system memory 705, including a random access memory 706 ("RAM") and a read-only memory ("ROM") 708, and a system bus 740 that couples the memory to the CPU 720. A basic input/output system containing the basic routines that help to transfer information between elements within the server 700, such as during startup, is stored in the ROM 708. The computer 700 further includes a mass storage device 722 for storing an operating system 728, application programs, and other program modules, as described herein.

The mass storage device 722 is connected to the CPU 720 through a mass storage controller (not shown), which in turn is connected to the bus 740. The mass storage device 722 and its associated computer-readable media provide non-volatile storage for the processing device 700. Although the description of computer-readable media contained herein refers to a mass storage device, such as a hard disk or CD-ROM drive, it should be appreciated by those skilled in the art that computer-readable media can be any available computer storage media that can be accessed by the computer 700.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the processing device 700. Transitory signals are not considered as computer-readable media.

According to various embodiments, the processing device 700 may operate in a networked environment using logical connections to remote computers or servers through a network (not shown in FIG. 7). The processing device 700 may connect to the network through a radio interface unit 750 connected to the bus 740. It should be appreciated that the radio interface unit 750 may also be utilized to connect to other types of networks and remote computer systems. In other embodiments, connection to other types of network may be accomplished using an input/output controller 704. The input/output controller 704 can be used for receiving and processing input from a number of other devices, including a keyboard, mouse, or electronic stylus (not shown in FIG. 7). Similarly, an input/output controller 704 may provide output to a display screen, a printer, or other type of output device (also not shown in FIG. 7). In one embodiment, the computing device may incorporate a touch screen display 706. The touch screen display 706 functions to not only display information, but also to receive input from the user, including inputting text, commands, and controls.

As mentioned briefly above, a number of program modules and data files may be stored in the mass storage device 722 and RAM 706 of the processing device 700, including an operating system 728 suitable for controlling the operation of a networked desktop, laptop, tablet or server computer. The mass storage device 722 and RAM 706 may also store one or more program modules or data files. In particular, the mass storage device 722 and the RAM 706 may store a document authoring application 710. The same storage device 722 and the RAM 706 may store a document view control module 726 which may incorporate the instructions for controlling which view is presented on the display. In one embodiment, the document view control module 726 is part of the document authoring application 710, but in other embodiments, it could be a separate module from the document authoring application 710. The mass storage device 722 and the RAM 706 may also store other types of applications and data.

It should be appreciated that the software components described herein may, when loaded into the processor 720 and executed, transform the processor 720 and the overall processing device 700 from a general-purpose computing system into a special-purpose computing system customized to facilitate the functionality presented herein. The processor 720 may be constructed from any number of transistors or other discrete circuit elements, which may individually or collectively assume any number of states. More specifically, the processor 720 may operate as a finite-state machine, in response to executable instructions contained within the software modules disclosed herein. These computer-executable instructions may transform the processor 720 by specifying how the processor 720 transitions between states, thereby transforming the transistors or other discrete hardware elements constituting the processor 720.

Encoding the software modules presented herein may also transform the physical structure of the computer-readable media presented herein. The specific transformation of physical structure may depend on various factors, in different implementations of this description. Examples of such factors may include, but are not limited to the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software may also transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the processing device 700 in order to store and execute the software components presented herein. It also should be appreciated that the processing device 700 may comprise other types of computing devices, including hand-held computers, embedded computer systems, personal digital assistants, and other types of computing devices known to those skilled in the art. It is also contemplated that the processing device 700 may not include all of the components shown in FIG. 7, may include other components that are not explicitly shown in FIG. 7, or may utilize an architecture completely different than that shown in FIG. 7.

Figure 8:
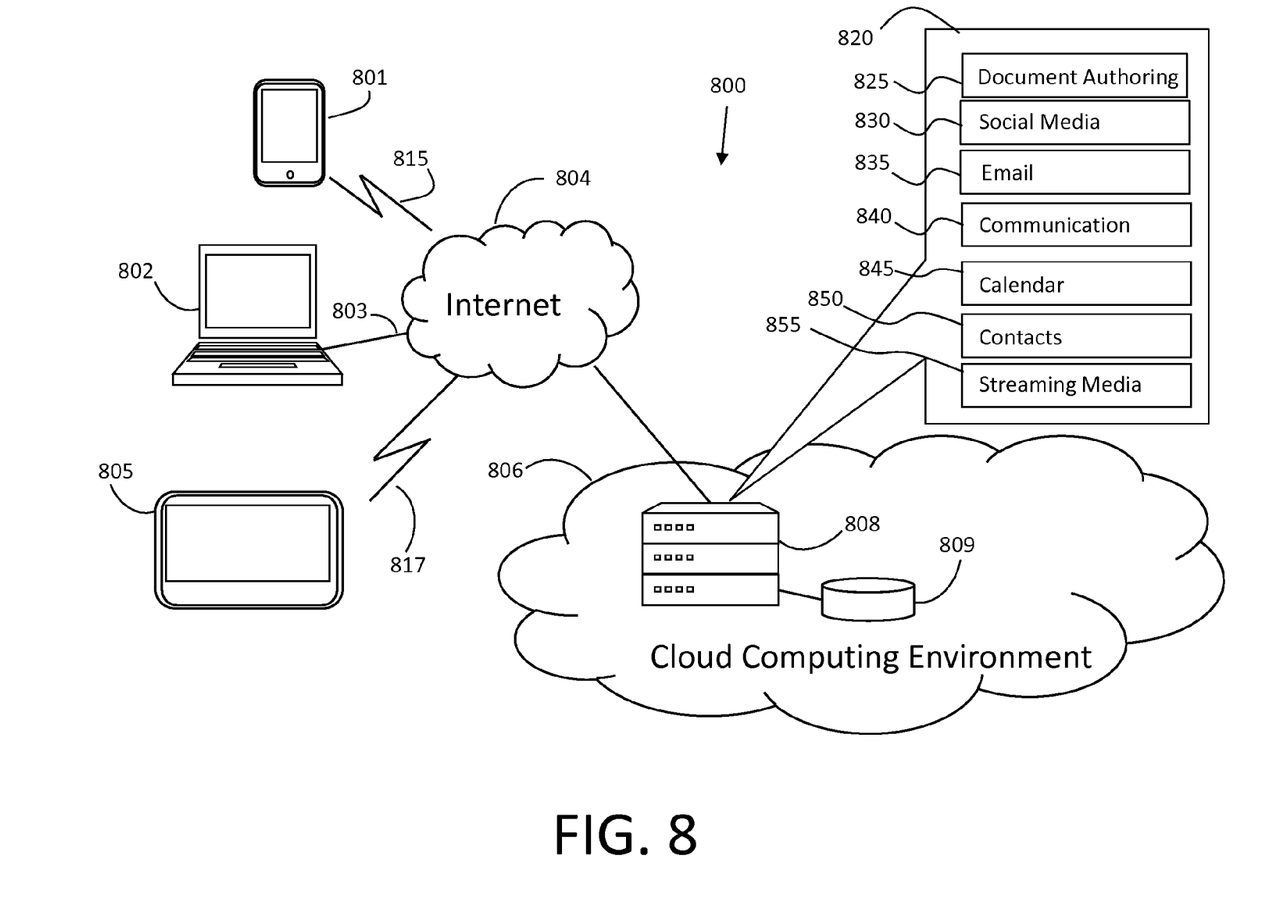
FIG. 8 illustrates a computing architecture for cloud based system for implementing the process flows according to one embodiment presented herein.

FIG. 8 illustrates another context in which the concepts and technology described above can be embodied. In FIG. 8 a user's computer 802, such as a laptop computer or desktop computer accesses a communications network 804, such as the Internet. A wired connection 803 can be used, or a wireless connection based on various type of wireless technology could be used as well. In other embodiments, the user may use a smart phone type of device 801 using a cellular type wireless connection 815 or a mobile computing device 805, such as a tablet computing device using another type of wireless data technology 817 to access the communications network. Other types of computing devices can be used as well.

The processing device 801, 802, or 805 accesses a server 808 in a cloud computing environment 806, which can access data in a storage device 809. The storage device 809 may store data associated with the user for various applications, in addition to maintaining documents for the user. The server 808 can host various applications 820, including a document authoring program 825 that the user can access using computer 801, 802 or 805. The server 808 implements the methods disclosed above for toggling between different views based on user requests to zoom-out, or other types of inputs, and can have a similar architecture as the processing device illustrated in FIG. 8. Thus, the principles and concepts discussed above are not limited to executing on a local computing device.

The server 808 may execute other applications for the user, including social media applications 830, email applications 835, communication applications 840, calendar applications 845, contact organization applications 850, as well as applications providing access to various types of streaming media. Any of these and other applications can utilize the semantic zoom concepts disclosed herein as applicable.

Based on the foregoing, it should be appreciated that systems and methods have been disclosed for providing functionality in a document authoring program that can toggle the view of a document to a user based on various inputs. A request for zooming-out past a threshold can trigger a change of view to a semantic zoom viewing mode, where the user can easily view thumbnail pages of the documents, headings associated with the document in a heading pane, and perform searches for terms within the document. Further, easy identification of comments within a section or on a page can be provided to the user.

It should also be appreciated that the subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

The invention claimed is:

1. A method that alters a view of a document comprising:
providing on a display of a computer processing device an editing view of a document at a zoom level such that input from a user can be received to edit content of the document;
receiving a first input from the user requesting to zoom-out the editing view of the document from the zoom level;
testing whether a resulting zoom level of the document is less than a threshold zoom level;
altering the view of the document to provide a semantic zoom view of the document in response to determining the resulting zoom level is less than the threshold zoom level, wherein the semantic view of the document provides a plurality of thumbnails pages on the display and a heading pane comprising a plurality of headings contained in one or more pages of the document;
receiving a second input from the user indicating a selection of one of the plurality of headings in the heading pane; and providing on the display of the computer processing device a subset of the plurality of thumbnail pages in the thumbnail pane in response to receiving the second input,
wherein the subset of the plurality of thumbnail pages comprises a thumbnail page corresponding to the selection of one of the plurality of headings in the heading pane and a plurality of and preceeding and succeeding thumbnail pages to the thumbnail page.

2. The method of claim 1, wherein the editing view of the document displays a menu bar of editing commands on the display that alters content of the document, and
wherein in the semantic zoom view removes the menu bar of editing commands on the display.

3. The method of claim 2, wherein the computer processing device is a computer tablet comprising a touch screen, and receiving input from the user requesting to zoom-out the editing view comprises detecting a pinching motion of two fingers on the display.

4. The method of claim 1, wherein the editing view comprises presenting a menu bar.

5. The method of claim 1, wherein the threshold level is 15%.

6. The method of claim 1, further comprising:
receiving a third input from the user selecting a thumbnail page from the subset of the plurality of thumbnail pages provided on the display; and
providing on the display of the computer processing device the editing view of a page of the document corresponding to the selected thumbnail page.

7. A computer readable medium comprising instructions that when executed cause a computer to:
provide on a display of the computer processing device an editing view of a document at a zoom level such that input from a user can be received to edit content of the document;
receive input from the user requesting to zoom-out the editing view of the document from the zoom level;
test whether a resulting zoom level of the document is less than a threshold zoom level;
in response to determining the resulting zoom level is less than the threshold zoom level, alter the view of the document to provide a semantic zoom view of the document wherein a plurality of thumbnails pages are provided on the display, and a heading pane comprising a plurality of headings contained in one or more pages of the document;
receive a second input from the user indicating a selection of one of the plurality of headings in the heading pane; and
provide on the display of the computer processing device a subset of the plurality of thumbnail pages in the thumbnail pane in response to receiving the second input,
wherein the subset of the plurality of thumbnail pages comprises a thumbnail page corresponding to the selection of one of the plurality of headings in the heading pane and a plurality of preceding and succeeding thumbnail pages to the thumbnail page.

8. The computer readable medium of claim 7, wherein the instructions further cause the computer to:
provide a menu bar of editing commands on the display in conjunction with the editing view, and
remove the menu bar of editing commands on the display in conjunction with providing the semantic zoom view.

9. The computer readable medium of claim 8, further comprising instructions that cause the computer to:
interpret a pinching motion of two fingers on a touch-screen of the computer to toggle the view from the editing view to the semantic zoom view.

10. The computer readable medium of claim 9, further comprising instructions that cause the computer to:
evaluate a speed of the pinching motion to determine whether to toggle the view from the editing view to the semantic zoom view.

11. The computer readable medium of claim 9, further comprising instructions that cause the computer to:
detecting a touch of a finger on the touch-screen selecting one of the plurality of thumbnail pages provided on the display; and
in response to detecting the touch, toggle the view from the semantic zoom view to the editing view.

12. The computer readable medium of claim 11, further comprising instructions that cause the computer to:
display a page corresponding the one of the plurality of thumbnail pages in the editing mode at the zoom level.

13. The computer readable medium of claim 8, further comprising instructions that cause the computer to:
display a search box that searches a user provided term; and
display a heading pane comprising one or more headings derived from the document.

14. A system that provides an editing view and a semantic zoom view comprising:
a display;
an input device configured to receive input, and
a processor configured to
using the display, provide an editing view of a document comprising a page at a zoom level wherein a content of the document can be edited based on input from the input device,
receive a first input from the input device indicating a zoom-out request wherein the zoom-out request exceeds a threshold level,
using the display, provide a semantic view of the document in response the zoom-out request exceeding the threshold level, the semantic view comprising a plurality of thumbnail pages in a thumbnail pane and a plurality of headings in a heading pane, wherein the plurality of headings are derived from the document,
receive a second input from input device indicating a selection of one of the plurality of headings in the heading pane, and
using the display, provide a subset of the plurality of thumbnail pages in the thumbnail pane in response to receiving the second input,
wherein the subset of the plurality of thumbnail pages comprises a thumbnail page corresponding to the selection of one of the plurality of headings in the heading pane and a plurality of preceding and succeeding thumbnail pages to the thumbnail page.

15. The system of claim 14 wherein the display comprises a touch-screen, and the input device comprises the touch-screen.

16. The system of claim 14, wherein the processor is further configured to process a third input selecting one of the subset of the plurality of thumbnail pages and the processor in response to processing the third input presents a page from the document corresponding to the selected thumbnail page in the editing view at the zoom level.

* * * * *